UNITED STATES PATENT OFFICE.

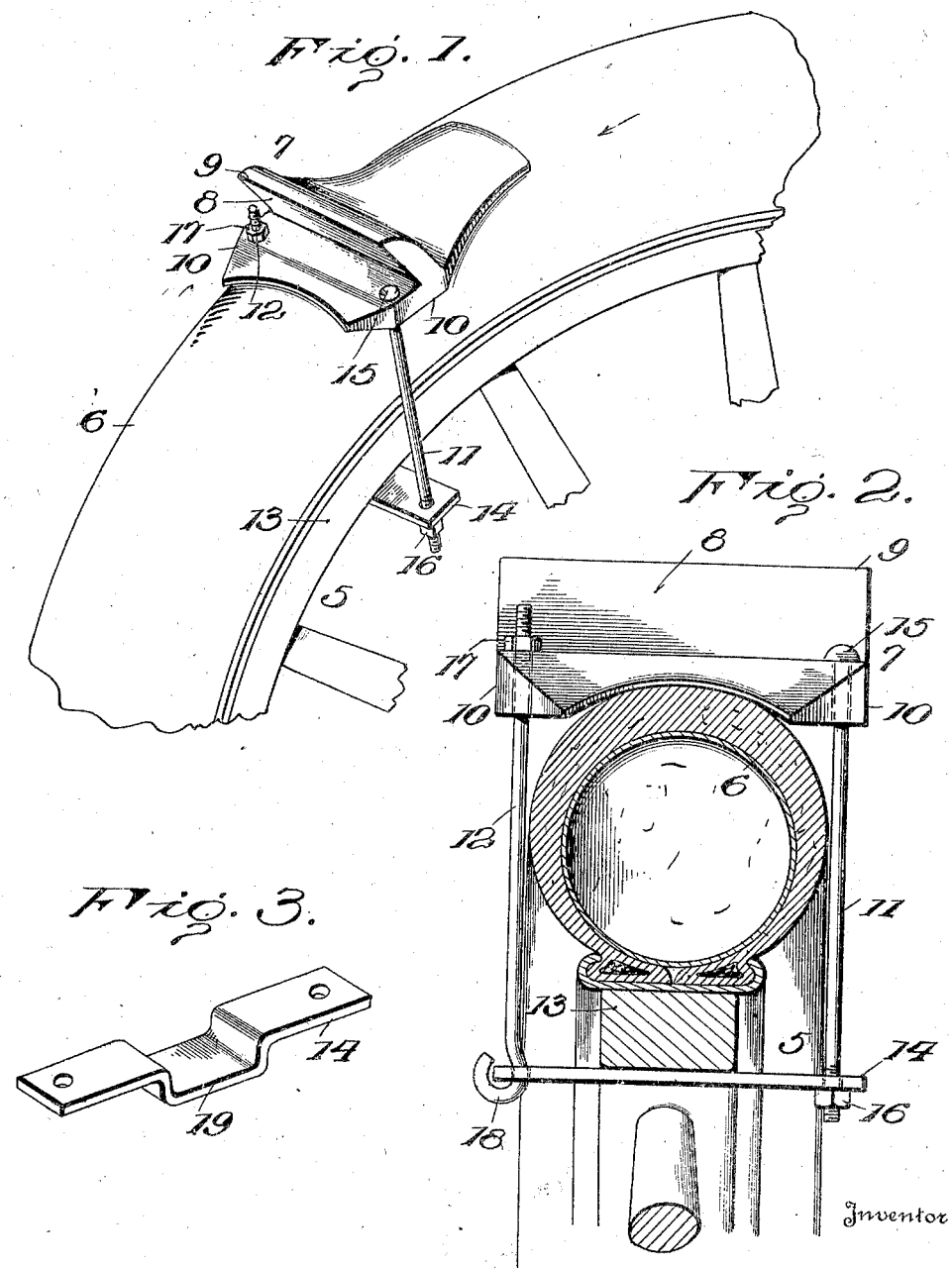

WILLIAM VLASAK, OF CHICAGO, ILLINOIS.

TRACTION-SPUR FOR MOTOR-VEHICLE WHEELS.

1,302,737.  Specification of Letters Patent.  Patented May 6, 1919.

Application filed October 3, 1917. Serial No. 194,558.

*To all whom it may concern:*

Be it known that I, WILLIAM VLASAK, a citizen of the United States, residing at Chicago, in the county of Cook and State of Illinois, have invented new and useful Improvements in Traction-Spurs for Motor-Vehicle Wheels, of which the following is a specification.

This invention relates to devices designed to be attached to motor vehicle wheels for extricating the car out of mud or sand holes.

It is the object of the present invention to provide an improved traction spur for the purpose stated, which is highly efficient in operation, and which can be readily attached to the wheel and removed therefrom.

The object stated is attained by means of a novel combination and arrangement of parts to be hereinafter described and claimed, and in order that the same may be better understood, reference is had to the accompanying drawing forming a part of this specification.

In the drawing,

Figure 1 is a perspective view showing the application of the invention;

Fig. 2 is a cross section of the tire, showing the device in place thereon, and

Fig. 3 is a perspective view showing a modified detail.

Referring specifically to the drawing, 5 denotes a fragment of a motor wheel, provided with a pneumatic tire 6 mounted on the rim of the wheel in the ordinary manner. The traction spur or shoe which is the subject matter of the present application for patent is shaped to fit the tread of the tire 6, and it is composed of a solid block or casting 7 which is concave at the bottom to fit the tire. Intermediate its ends, the block has a transverse outstanding traction rib or spur 8 having a slight incline forward or in the direction of travel, and tapered outward to a sharp edge 9 extending transversely of the tire. The intermediate portion of the block from which the traction spur extends is thickened to obtain the necessary strength and rigidity, and it also projects at its sides from the sides of the tire, as shown at 10, the projecting ends having apertures through which retaining members pass. One of these retaining members is a bolt 11 and the other retaining member is a rod 12. Beneath the wooden felly 13 of the wheel extends a transverse clip plate 14 having end apertures through which the retaining members pass. The head 15 of the bolt 11 engages the outer surface of the part 10 and a nut 16 screwed on the bolt engages the under side of the clip plate 14. One end of the rod 12 is threaded to receive a nut 17 which is screwed down against the part 10, and the other end of the rod is formed with a hook 18 which is passed through the aperture in the clip plate 14. The rod 12 is on the inner side of the wheel, and ordinarily it is not necessary to remove the same when the attachment is to be taken off the wheel. The nut 17 permits adjustment of the rod 12 to accommodate the attachment to tires of different sizes, and the rod may also be removed from the plate 14 to permit the substitution of the clip plate shown in Fig. 3.

To attach the device to the wheel, the bolt 11 is first removed, and the parts 7 and 14 are then set in place, after which the bolt 11 is attached and tightened up by the nut 16. Removal from the wheel is readily effected, it being necessary only to remove the bolt 11, which leaves the device free to be slipped off.

When the wheel felly has a rib on its under side, the plate 14 will be made with a depression 19, as shown in Fig. 3, to accommodate said rib.

In use, the device being in place on the wheel, the traction rib or spur 8 is driven into the mud or sand when the wheel turns, thereby extricating the car.

I claim :—

A traction spur for vehicle wheels, comprising a solid block having a concave under side to fit a tire tread, and provided with a top transverse traction rib, said block also having an elongated extension projecting from one side of the spur and another extension projecting from the other side of the spur, said last-mentioned extension carrying means for anchoring the block to the wheel against outward radial displacement.

In testimony whereof I affix my signature.

WILLIAM VLASAK.

Copies of this patent may be obtained for five cents each, by addressing the "Commissioner of Patents, Washington, D. C."